Patented Sept. 23, 1952

2,611,761

UNITED STATES PATENT OFFICE 2,611,761

ALKYL α-FLUOROACETOXY ACRYLATES, AND POLYMERS THEREOF

Joseph B. Dickey and Theodore E. Stanin, Rochester, N. Y., assignors to Eastman Kodak Company, Rochester, N. Y., a corporation of New Jersey No Drawing. Application August 11, 1950, Serial No. 179,002

12 Claims. (Cl. 260—78.3)

This invention relates to alkyl alpha-fluoroacetoxy acrylates, to polymers thereof, and to a process for their preparation.

This application is a continuation-in-part of our copending application Serial Number 654,523, filed March 14, 1946 (now U. S. Patent 2,525,530, dated October 10, 1950).

The new compounds of the invention are represented by the following general structural formula:

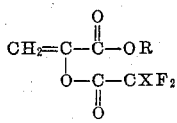

wherein R represents an alkyl group containing from 1 to 4 carbon atoms (e. g. methyl, ethyl, propyl, isopropyl, n-butyl, etc. groups) and X represents an atom of hydrogen or an atom of fluorine. The above-defined compounds are valuable intermediates for the preparation of other useful organic compounds, but especially valuable for the preparation of resinous polymers which are characterized by being less flammable and more stable to heat and water than similar acrylates containing no fluoromethyl group. The polymers are useful for the preparation of coating and impregnating compositions, sheets, threads, fibers, etc., and are also moldable to stable forms and shaped objects which are readily workable by mechanical means to desired finished products.

It is, accordingly, an object of the invention to provide new fluorine containing compounds, and resinous polymers thereof. Another object is to provide a process for preparing the same. Other objects will become apparent hereinafter.

In accordance with the invention, we prepare the new monomeric alkyl alpha-fluoroacetoxy acrylates by reacting α-difluoroacetoxy- or α-trifluoroacetoxy-β-chloropropionitrile with dry hydrogen chloride in the presence of an alcohol (e. g. methanol, ethanol, propanol, butanol, etc.), hydrolyzing the iminoether obtained in aqueous solution, separating the alkyl α-difluoroacetoxy- or alkyl α-trifluoroacetoxy-β-chloropropionate and reacting it with a tertiary organic amine (e. g. a trialkylamine such as triethylamine, tributylamine, etc., pyridine, quinoline, dimethylaniline, etc.) to give the desired alkyl α-difluoroacetoxy- or alkyl α-trifluoroacetoxy acrylate. The starting intermediates α-difluoroacetoxy- and α-trifluoroacetoxy-β-chloropropionitriles can be readily prepared by esterifying α-hydroxy-β-chloropropionitrile with difluoroacetic or trifluoroacetic anhydrides, respectively. The new monomeric compounds can also be prepared by starting with an alkyl ester, for example, an alkyl α-hydroxy-β-chloropropionate can be reacted with difluoroacetic or trifluoroacetic anhydride, followed by splitting off hydrogen chloride with one or more of the mentioned tertiary organic amines.

The polymerization of the new compounds of the invention alone or conjointly with each other or with one or more other unsaturated organic compounds is advantageously carried out in the presence of a polymerization catalyst. Peroxide polymerization catalysts which are soluble in the monomers or in solvent mediums for the polymerization can be employed, e. g., organic peroxides such as benzoyl peroxide, acetyl peroxide, lauroyl peroxide, tertiary butyl hydroperoxide, etc. Water soluble inorganic peroxides can also be used, e. g. hydrogen peroxide, ammonium persulfate, potassium persulfate, sodium persulfate, persulfuric acid, sodium perborate, the water-soluble salts of percarbonic acid, the water-soluble salts of perphosphoric acid, the water-soluble salts of sulfo-per-acid (Caro's acid). Boron trifluoride is also an effective polymerization catalyst. Mixtures of the catalysts can be employed. The amount of catalyst employed can advantageously be from 0.1 to 1% by weight of the monomers to be polymerized.

The polymerizations can be carried out in bulk (mass) in solvents or in heterogenous dispersion where the monomer or mixture of monomers is dispersed in a nonsolvent for the monomers, the particles of dispersed monomers being small (emulsion) or relatively large (bead or granular). In both bulk and solvent polymerizations, the organic peroxide catalysts are advantageously employed. Suitable solvents include acetone, 1,4-dioxane, methanol, ethanol, mixtures of these solvents with minor portions of water, benzene, etc. Mixtures of solvents can be employed.

For emulsion polymerization any nonsolvent for the monomer or the mixture of monomers can be employed, water being especially advantageous. The monomor or mixture of monomers can be advantageously emulsified in water using emulsifying agents such as salts of higher fatty acids, e. g. sodium or potassium stearate, palmitate, etc. or ordinary soaps, salts of higher fatty alcohol sulfates, e. g. sodium or potassium lauryl sulfate, sodium or potassium di(2-ethylhexyl) sulphosuccinate, sodium or potassium cetyl sulfate, sodium or potassium stearyl sulfate, etc., salts of aromatic sulfonic acids, e. g., sodium or potassium salts of alkylnaphthalene sulfonic acids, etc., higher molecular weight quaternary ammonium salts, e. g., dimethyl benzylphenyl ammonium chloride, quaternary ammonium salts containing the radicals $C_{15}H_{31}$ and $C_{17}H_{35}$, etc. Mixtures of emulsifying agents can be employed. For bead or granular polymerization, relatively poor dispersing agents such as starch, methylated starch, gum arabic, polyvinyl alcohol, partly hydrolyzed polyvinyl acetate, gelatin, sodium glycolate, etc. can be employed. Mixtures of these dispersing agents can also be used. In the above polymerizations wherein the monomer or mixture of monomers is dispersed in a nonsolvent, the dispersion can be facilitated by stirring, shaking or tumbling the polymerization mixture. Heat accelerates all the polymerizations, a temperature of from 30 to 120° C. for a period of from 30 minutes to as much as several days or more being advantageous.

The copolymers of the invention can contain variable amounts of each comonomer and are obtained with starting polymerization mixtures containing from 5 to 95 parts by weight of the new compounds of the invention and from 95 to 5 parts by weight of one or more other unsaturated organic compounds. The resinous copolymers obtained have found to be substantially of the same proportions as the starting mixtures of comonomers. Suitable other unsaturates for copolymerizing with the new compounds of the invention include vinyl carboxylic acid esters such as vinyl acetate, vinyl propionate, vinyl benzoate, etc., alkyl esters of acrylic and methacrylic acids such as methyl acrylate, ethyl acrylate, butyl acrylate, methyl methacrylate, etc., unsaturated nitriles such as acrylonitrile, methacrylonitrile, etc., vinyl hydrocarbons such as styrene, α-methylstyrene, vinyl chloride, etc. and similar ethylenically unsaturated organic compounds.

The following examples will serve to illustrate further our new unsaturates, polymers thereof, and the manner of preparing the same.

*Preparation of ethyl α-trifluoroacetoxy-β-chloropropionate*

(a) 23 g. of trifluoroacetic anhydride were slowly added to a cooled solution of 15 g. of ethyl α-hydroxy-β-chloropropionate in 100 cc. of diethyl ether. The temperature was maintained at 0° C. during the addition of the trifluoroacetic anhydride by cooling in an ice salt bath. After the addition was completed, the reaction mixture was heated to gentle reflux for a period of one hour. Fractionation of the reaction mixture gave a 92% yield of ethyl α-trifluoroacetoxy-β-chloropropionate, B. P. 72–74° C./8–9 mm. pressure.

By substituting an equivalent amount of difluoroacetic anhydride for the trifluoroacetic anhydride in the above example, there is obtained the corresponding difluoro compound, ethyl α-difluoroacetoxy-β-chloropropionate. Also by replacing the ethyl α-hydroxy-β-chloropropionate in the above example with an equivalent amount of other alkyl esters such as methyl α-hydroxy-β-chloropropionate, butyl α-hydroxy-β-chloropropionate, etc., the corresponding alkyl α-difluoroacetoxy- and alkyl α-trifluoroacetoxy-β-chloropropionate, etc., are obtained.

(b) 4 g. of dry hydrogen chloride were slowly bubbled into 17 g. of α-trifluoroacetoxy-β-chloropropionitrile dissolved in 50 cc. of diethyl ether containing 5 g. of anhydrous ethanol. The reaction mixture was allowed to stand for several hours after the addition of the hydrogen chloride was completed. The iminoether hydrochloride precipitated from solution. There were then added 75 cc. of water to the reaction mixture which hydrolyzed the iminoether to ethyl α-trifluoroacetoxy - β - chloropropionate. In place of the ethanol in the above example, there can be substituted an equivalent amount of other monohydric saturated aliphatic alcohols containing from 1 to 4 carbon atoms, to give the corresponding esters. For example, methanol gives methyl α-trifluoroacetoxy - β - chloropropionate, n-propanol gives n-propyl-α-trifluoroacetoxy-β-chloropropionate and n-butanol gives n-butyl-α-trifluoroacetoxy-β-chloropropionate.

*Example 1.—Ethyl α-trifluoroacetoxy acrylate*

24 g. of ethyl α-trifluoroacetoxy-β-chloropropionate and 13 g. of quinoline were added to 100 cc. of benzene. The reaction mixture was refluxed for a period of 10 hours. The mixture was then washed with water and dilute hydrochloric acid, and dried over anhydrous sodium carbonate. Fractionation of the dried benzene solution gave a good yield of ethyl α-trifluoroacetoxy acrylate, B. P. 43–45° C./8–9 mm. pressure.

In place of quinoline in the above example, there can be substituted a like amount of another tertiary amine such as pyridine, dimethylaniline or tributylamine to give similarly good yields of ethyl α-trifluoroacetoxy acrylate.

*Example 2.—n-Butyl α-trifluoroacetoxy acrylate*

27 g. of butyl α-trifluoroacetoxy-β-chloropropionate, B. P. 104–106° C./15 mm. pressure, and 13 g. of quinoline were added to 100 cc. of benzene. The reaction mixture was refluxed for a period of 20 hours. The benzene solution was then washed with water and dilute hydrochloric acid, and dried over anhydrous sodium carbonate. Fractionation of the benzene solution gave 84% yield of butyl α-trifluoroacetoxy acrylate, B. P. 67–69° C./8–9 mm. pressure.

*Example 3.—Methyl α-trifluoroacetoxy acrylate*

24 g. of methyl α-trifluoroacetoxy-β-chloropropionate and 13 g. of quinoline were added to 100 cc. of benzene. The reaction mixture was refluxed for 15 hours. The benzene solution was washed with water and dilute hydrochloric acid, and dried over anhydrous potassium corbonate. Fractionation of the benzene solution gave 89% yield of methyl α-trifluoroacetoxy acrylate, B. P. 52–54° C./19–20 mm. pressure.

*Example 4.—Ethyl α-difluoroacetoxy acrylate*

23 g. of ethyl α-difluoroacetoxy-β-chloropropionate and 13 g. of quinoline were added to 100 cc. of benzene and the mixture refluxed for a period of 12 hours. The mixture was then washed with water and dilute hydrochloric acid, and dried over anhydrous sodium carbonate. Fractionation of the dried benzene solution gave an excellent yield of ethyl α-difluoroacetoxy acrylate, B. P. 46–48° C./8–9 mm. pressure.

*Example 5.—n-Butyl-α-difluoroacetoxy acrylate*

26 g. of n-butyl α-difluoroacetoxy-β-chloropropionate and 13 g. of quinoline were added to 100 cc. of benzene. The reaction mixture was refluxed for 20 hours. The mixture was then washed with room temperature water and dilute hydrochloric acid, and dried over anhydrous sodium carbonate. On fractionation of the dried benzene solution, there were obtained a good yield of n-butyl α-difluoroacetoxy acrylate, B. P. 69–71° C./8–9 mm. pressure.

*Example 6.—Methyl α-difluoroacetoxy acrylate*

24 g. of methyl α-difluoroacetoxy-β-chloropropionate and 8 g. of pyridine were added to 100 cc. of benzene and the mixture refluxed for a period of 15 hours. The benzene mixture was then washed with water and dilute hydrochloric acid, and dried over anhydrous potassium carbonate. It was fractionated to give methyl α-difluoroacetoxy acrylate, B. P. 55–57° C./19–20 mm. pressure.

*Example 7.—Poly butyl α-trifluoroacetoxy acrylate*

20 g. of butyl α-trifluoroacetoxy acrylate and 0.1 g. of benzoyl peroxide were placed in a sealed glass tube and heated in a water bath at 60° C. for a period of 24 hours. A clear, hard polymer which was soluble in acetone was obtained.

In place of the butyl α-trifluoroacetoxy acrylate in the above example, there can be substituted a like amount of methyl α-trifluoroacetoxy acrylate, ethyl α-trifluoroacetoxy acrylate or propyl α-trifluoroacetoxy acrylate to give similar acetone soluble, clear, hard, resinous homopolymers. All of the polymers of this example were excellent molding materials.

*Example 8.—Polymethyl α-difluoroacetoxy acrylate*

30 g. of methyl α-difluoroacetoxy acrylate were added to 100 cc. of distilled water in which were dissolved 3 g. of a sodium salt of a sulfonated hydrocarbon and 2 g. of soap flakes. To the above emulsion, there were added 0.3 g. of ammonium persulfate and 0.3 g. of sodium bisulfite. After agitating the emulsion at 50° C. for a period of 24 hours, it was poured into 300 cc. of saturated sodium chloride solution. The coagulated resinous polymer was washed with water and dried. It was soluble in acetone and 1,4-dioxane and readily moldable to clear, hard objects.

In place of the methyl α-difluoroacetoxy acrylate in the above example, there can be substituted a like amount of ethyl α-difluoroacetoxy acrylate, propyl α-difluoroacetoxy acrylate or butyl α-difluoroacetoxy acrylate to give similar acetone-soluble and 1,4-dioxane-soluble, clear, hard, resinous homopolymers. All of these gave excellent results in molding compositions.

*Example 9.—Copolymer of methyl α-trifluoroacetoxy acrylate and ethyl α-trifluoroacetoxy acrylate*

5 g. of ethyl α-trifluoroacetoxy acrylate, 10 g. of methyl α-trifluoroacetoxy acrylate and 0.1 g. of benzoyl peroxide were placed in a sealed glass tube under an atmosphere of nitrogen, and the tube placed in a constant temperature both maintained at 50° C. After 16 hours, a hard, clear, resinous copolymer was obtained. It was soluble in acetone.

*Example 10.—Copolymer of ethyl α-trifluoroacetoxy acrylate and methyl methacrylate*

5 g. of ethyl α-trifluoroacetoxy acrylate, 12 g. of methyl methacrylate and 0.09 g. of benzoyl peroxide were placed in a sealed glass tube under an atmosphere of nitrogen, and placed in a constant temperature water bath at 50° C. for a period of 20 hours. A clear, colorless, hard copolymeric resin was formed. The resin was soluble in acetone.

*Example 11.—Copolymer of methyl α-trifluoroacetoxy acrylate and styrene*

10 g. of methyl α-trifluoroacetoxy acrylate, 5 g. of styrene and 0.08 g. of benzoyl peroxide were placed in a sealed ampoule under an atmosphere of nitrogen. The ampoule was placed in a constant temperature bath maintained at 50° C. After three days, a hard, clear, copolymeric resin had formed. The polymer was soluble in acetone and 1,4-dioxane. It was an excellent material for molding purposes.

*Example 12.—Copolymer of methyl α-trifluoroacetoxy acrylate and acrylonitrile*

5 g. of methyl α-trifluoroacetoxy acrylate, 10 g. of acrylonitrile, 1 g. of potassium laurate, 0.1 g. of potassium persulfate and 0.1 g. of sodium bisulfite were added to 50 cc. of water. The mixture was then tumbled in a water bath at 40° C. for a period of 6 hours. The resulting copolymer was filtered, washed with water, and dried. The copolymer was soluble in acetone and contained by analysis 32% of methyl α-trifluoroacetoxy acrylate groups, the remainder being acrylonitrile groups. It was spinnable from its solutions to give high quality yarn by a dry spinning method.

Proceeding as shown in the foregoing examples, other resinous copolymers can be prepared, for example, from monomeric mixtures containing 5%, 15%, 25%, 45%, 55%, 75% or 85% by weight of at least one of the new alkyl fluoroacetoxy acrylates of the invention, the remaining polymerizable monomers in each case being, for example, vinyl acetate, vinyl chloride, methyl acrylate, methyl methacrylate, acrylonitrile or similar unsaturates hereinbefore mentioned.

All of the polymers of the invention can be dissolved in one or more organic solvents, for example, in acetone, 1,4-dioxane, etc. to form solutions or dopes which can be extruded to filaments, coated to continuous sheets or applied as impregnating agents to paper and textile materials. The copolymers with acrylonitrile are especially useful for preparing filaments which can be spun to yarn. The polymers of the invention can also be molded with or without plasticizers, fillers, coloring matter, etc., by means of extrusion, injection or compression methods into shaped objects.

What we claim is:

1. A compound having the following general structural formula:

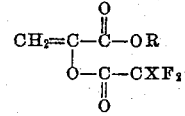

wherein R represents an alkyl group containing from 1 to 4 carbon atoms and X represents a member selected from the group consisting of an atom of hydrogen and an atom of fluorine.

2. Ethyl α-trifluoroacetoxy acrylate.
3. n-Butyl α-trifluoroacetoxy acrylate.
4. Methyl α-trifluoroacetoxy acrylate.
5. Ethyl α-difluoroacetoxy acrylate.
6. n-Butyl α-difluoroacetoxy acrylate.
7. A polymer of a compound having the following general structural formula:

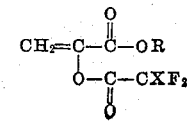

wherein R represents an alkyl group containing from 1 to 4 carbon atoms and X represents a member selected from the group consisting of an atom of hydrogen and an atom of fluorine.

8. Poly methyl α-difluoroacetoxy acrylate.

9. Poly butyl α-trifluoroacetoxy acrylate.

10. A copolymer of from 5 to 95 parts by weight of methyl α-trifluoroacetoxy acrylate and from 95 to 5 parts by weight of styrene.

11. A copolymer of from 5 to 95 parts by weight of methyl α-trifluoroacetoxy acrylate and from 95 to 5 parts by weight of acrylonitrile.

12. A copolymer of from 5 to 95 parts by weight of n-ethyl α-trifluoroacetoxy acrylate and from 95 to 5 parts by weight of methyl methacrylate.

JOSEPH B. DICKEY.
THEODORE E. STANIN.

REFERENCES CITED

The following references are of record in the file of this patent:

UNITED STATES PATENTS

| Number | Name | Date |
| --- | --- | --- |
| 2,464,120 | Dickey et al. | Mar. 8, 1949 |